July 3, 1934.     R. THUN     1,964,834
PHOTOGRAPHIC PRINTING APPARATUS
Filed Nov. 10, 1930     2 Sheets-Sheet 1
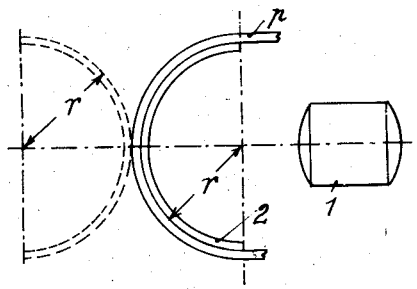
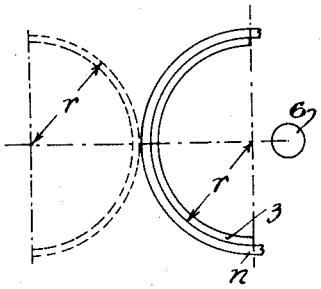
Fig. 1.
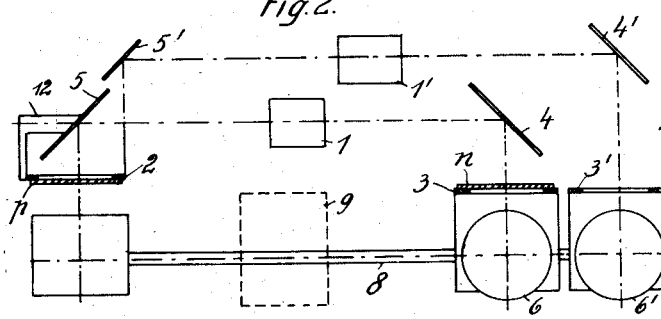
Fig. 2.
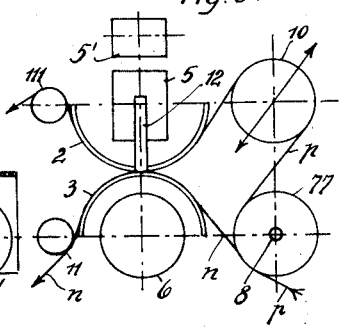
Fig. 3.
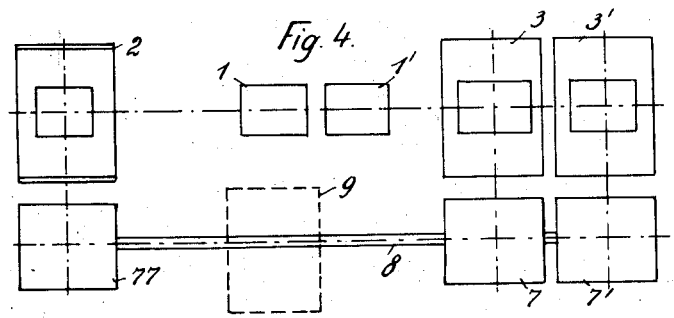
Fig. 4.
Fig. 5.
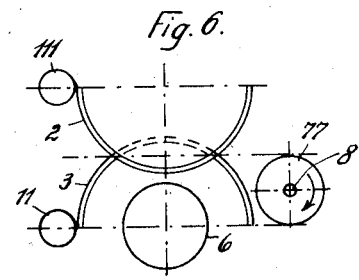
Fig. 6.
Inventor:
Rudolph Thun
by Kuichach
Atty.

July 3, 1934.  R. THUN  1,964,834
PHOTOGRAPHIC PRINTING APPARATUS
Filed Nov. 10, 1930   2 Sheets-Sheet 2
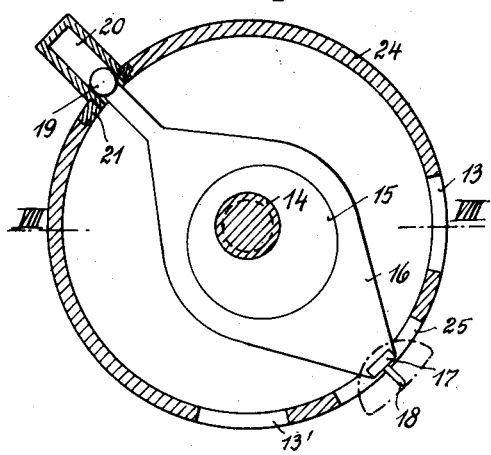
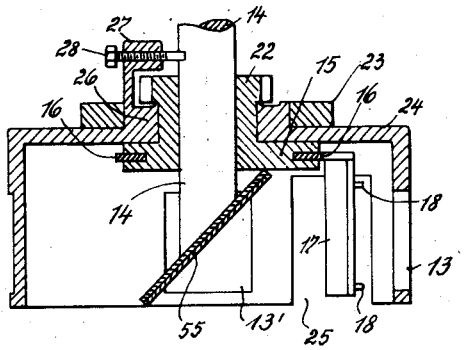
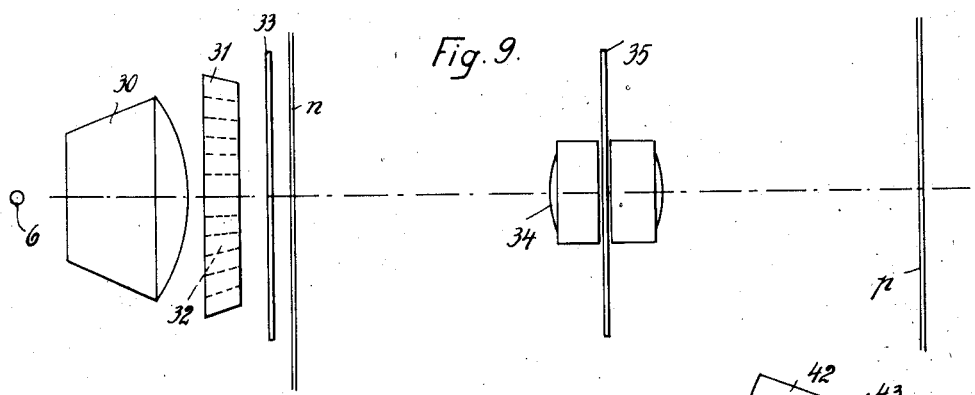
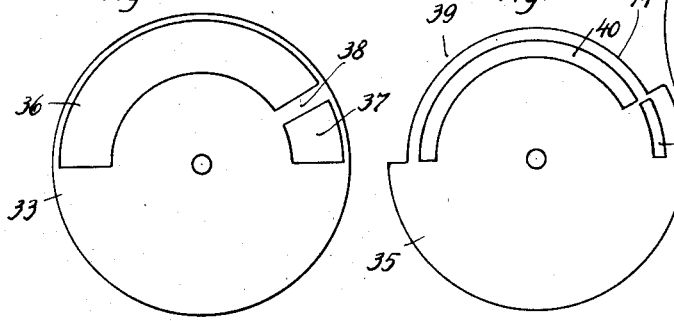
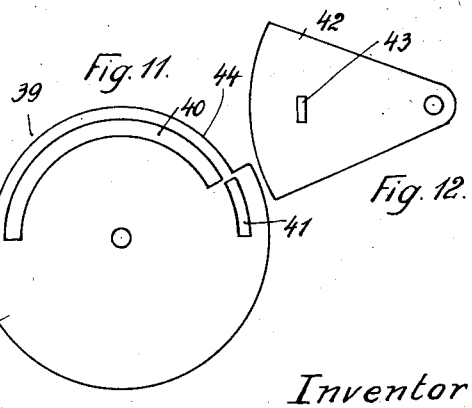
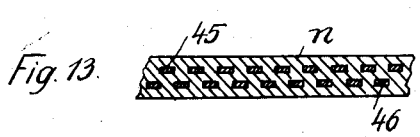
Inventor:
Rudolph Thun
by Kunchatt
Atty.

Patented July 3, 1934

1,964,834

UNITED STATES PATENT OFFICE 1,964,834

PHOTOGRAPHIC PRINTING APPARATUS

Rudolph Thun, Schoneiche, Germany

Application November 10, 1930, Serial No. 494,656
In Germany November 8, 1929

3 Claims. (Cl. 88—24)

My invention relates to photographic printing apparatus, and more particularly to apparatus in which the sensitive layer to be copied on is curved, with the object of compensating the action of the curved focussing surface of an objective or other source of light, and it is an object of my invention to improve an apparatus of this type.

To this end I provide, in combination with light-projecting means such as an objective, a mirror, or a combination of an objective and a mirror or mirrors, a concave and a convex guide at opposite sides of the light-projecting means which guides may be normal picture gates for a negative film and the positive film to be printed or copied from the negative, and I so design the guide or picture gate for the positive or copy film that it will curve this film in conformity with the focussing surface of the light-projecting means. One of the curved guides or picture gates presents its concave, and the other presents its convex side to the light-projecting means.

It is another object of my invention to provide a film-printing machine embodying the above-mentioned principle.

To this end I provide a pair of curved picture gates with parallel axes of curvature, with a source of light adapted to illuminate the picture gates and arranged in the axis of the curvature of one of them, and means for moving a film past each gate. The film which is moved past the gate with the source of light is the original or negative, and the film which is moved past the other gate, is the copy or positive film.

It is still another object of my invention to provide means for varying the character of the copies obtained.

To this end I provide means intermediate the sensitive layer and a source of light, which may be an objective, by which polarized and diffused rays are admitted to the layer, in combination with means for varying the ratio of the polarized and the diffused rays as required for obtaining copies of the desired character.

It has already been suggested to compensate the curvature of the focussing surface of objectives by curving the surface illuminated by the light from the objective, but my invention relates to a particular case of such curvature which is particularly adapted to the printing of moving-picture films. Here it is necessary, particularly if the printing is effected by the so-called optical method, that is, through the medium of an objective intermediate the source of light and the film to be copied, that the film should be exactly in the focussing surface, as otherwise a disturbing motion of the film which is known as "breathing", will occur. Heretofore the film was held exactly in the required position by guiding it between a pair of glass plates, the plates being moved apart for feeding the film. Notwithstanding this relieving of the pressure on the film during the feeding periods, the original or negative film is worn considerably by friction.

These drawbacks are eliminated according to my invention by providing means for curving the sensitive layer, normally, the positive film, in conformity with the focussing surface of the source of light or an objective which is the equivalent of a source of light. The curvature of the sensitive layer may be calculated by the rules of geometric optics, that is, it is possible to determine the curvature of a sensitive layer for a given focussing surface. Two such surfaces are strictly true only for a given magnifying or diminishing ratio. In practice, however, and within comparatively wide limits, the two surfaces are equivalent to strictly true ones if curved on the same radius, independently of the magnifying or diminishing ratio.

In an optical printing machine for moving-picture films, that is, in a machine in which an objective is arranged intermediate the source of light and the positive film, the dimensions may be readily selected in such manner that with equal curvature of the two films the departure from the strictly true curvature is negligible. In this manner, I obtain printing machines which possess certain advantages as compared with existing machines, as will appear from the following specification, it being understood, however, that I am not limited to film printers but that other photographic apparatus may be designed on the same principle.

In the drawings affixed to this specification and forming part thereof various apparatus embodying my invention are illustrated diagrammatically by way of example.

In the drawings

Fig. 1 is a diagram illustrating the principle of my invention,

Fig. 2 is a partly sectional elevation,

Fig. 3 is an end elevation, viewed from the left in Fig. 1, and

Fig. 4 is a plan view of a printer,

Fig. 5 is a partly sectional elevation, and

Fig. 6 is an end elevation, viewed from the left in Fig. 5, of a modified printer, Fig. 7 is a sectional elevation of a picture gate in combination with a claw, drawn to a larger scale, Fig. 8 is a section on the line VIII—VIII in Fig. 7, Fig. 9 is a diagram of an apparatus by which polarized and diffused rays are admitted to a sensitive layer at a given ratio, Figs. 10–12 are elevations of shutters for the apparatus diagrammatically illustrated in Fig. 9, and Fig. 13 is a magnified section of a sensitive layer showing a given arrangement of opaque grains in the layer.

Referring now to the drawings, and first to the diagram Fig. 1, 1 is an objective, $n$ and $p$ are a negative and a positive film, respectively, which cooperate with the objective so that the negative film is copied on the positive film, 2 and 3 are members, for instance, picture gates, which impart to the films the curvature indicated, and 6 is a source of light, for instance, an incandescent lamp, which by way of example is shown at the guide or picture gate 3 for the negative film $n$. The source of light may be arranged in any desired position with respect to the guide 3, but in some cases, as will be described below, it is arranged in the axis about which one of the guides or picture gates is curved. The arrangement of the picture gates or the like may also be as indicated in dotted lines, that is, with the convex side of the positive picture gate 2, and the concave side of the negative picture gate 3, facing the objective 1. As explained, it is not necessary that the curvature should be strictly in conformity with the rules of geometric optics, and under normal conditions the approximation will be satisfactory if both picture gates, or other means, 2 and 3 are curved on the same radius $r$, independently of the magnifying or diminishing ratio.

Referring now to Figs. 2, 3 and 4, 6 is the lamp, 3 is a curved picture gate for the negative film $n$, 4 is a mirror or prism which deflects at right angles the rays from the lamp 6, 1 is an objective to which the rays are deflected by the mirror 4, 5 is another mirror or prism at the opposite side of the objective 1 which deflects at right angles the rays from the objective 1, $p$ is the positive film, and 2 is its curved picture gate. It will appear that the rays from the source of light 6, which is in the axis of the "negative" picture gate 3, are deflected into the objective 1 by the mirror 4, and onto the film $p$ on the "positive" picture gate 2.

Corresponding parts for copying a phonogramme from a negative to a positive film are designated by the same reference numerals as the parts just described, but with the index "'", for instance, the lamp 6'.

8 is the feeding shaft which is rotated in the direction of the arrow, Fig. 3, by any suitable means, not shown. The shaft 8 supports a sprocket 7 for feeding the negative film $n$, and a sprocket 77 for feeding the positive film $p$. The sprockets may be equipped with the usual teeth for engaging perforations at the edges of the films. 9 is a diagram indicating a mechanism of any suitable type by which the sprockets 7 and 77 may be connected with, or disconnected from, the shaft 8. 11 is a guiding roller for the negative film $n$, and 111 is a guiding roller for the positive film $p$. 10 is a deflecting roller for the positive film $p$ which is arranged intermediate the sprocket 77 and the positive picture gate 2, which permits arranging the two sprockets 7 and 77 on the single shaft 8. This is particularly desirable when phonogrammes are copied as it eliminates the irregularities connected with gear wheels. The deflecting roller is preferably supported so as to be displaced axially, with the object of regulating the position of the partition lines between the pictures when the gate 2 is rotated. The "negative" gate 3 may be equipped with a similar deflecting roller, but rollers must not be provided for both gates together. The deflection of the rays by the mirrors 4 and 5 is effected with the same object, to wit, arranging the sprockets 7 and 77 on the same shaft 8. As lamp 6 is arranged in the axis about which the "negative" picture gate 3 is curved the picture gate may be rotated about its axis for adjusting its opening, without interfering with the passage of the rays. If the lamp 6 is so large that it cannot be arranged in the axis of the picture gate 3 it may be arranged at one side of the gate and a mirror may be arranged in the axis of the picture gate, as will be described with reference to Figs. 7 and 8. By rotating the mirror with the picture gate the picture is edged which is advantageous as compared with old systems in which edging of the picture can only be effected by rotating it about the axis of the picture gate, which requires complicated mechanical means for transmitting the movements. By displacing the objective 1 laterally and up and down, all variations of the picture area which may be desired, are readily effected.

If it is desired to vary the lengths of films when copying, the sprockets 7 and 77 on the shaft 8 may be designed with correspondingly different numbers of teeth or may be exchangeable, and the magnifying or diminishing ratio of the objective is varied in accordance with the numbers of the teeth.

Referring now to Figs. 5 and 6, the arrangement illustrated is substantially the same as in Figs. 2–4 but the deflecting roller 10 is dispensed with. This is effected by so positioning the picture gates 2 and 3 so that their end projections overlap, Fig. 6, and arranging the pulling side of the sprocket 77 so that the common chord of the intersecting picture gates is tangent to the sprocket 77.

The printers illustrated in Figs. 2–6 are of the "slit" type in which the two films move past their picture gates continuously and at uniform velocity. The relative velocity of the two films is a function of the magnifying or diminishing ratio of the objective 1, and becomes nil if the ratio is 1 by 1.

With the exception of phonogrammes, the picture area cannot be varied in a printer of the slit type, as intermittent movement of the films is the condition for this.

In machines for intermittent movement which will now be described with reference to Figs. 7 and 8, the picture area is varied by rotating the picture gates but provision must be made for preventing displacement of the partition lines between two pictures. The picture gate illustrated in Figs. 7 and 8 is equipped with means for preventing such displacement, as shown in Figs. 7 and 8. 24 is a "negative" picture gate which here is designated as a complete cylinder, with picture-gate openings 13 and 13' and a recess 25. 23 is a stationary but adjustable boss surrounding a flanged bearing 26 in the end wall of the cylinder 24. 22 is a pinion to which rotation is imparted by any suitable means, not shown, and which is mounted to rotate in the bearing 26, and 15 is an eccentric which is integral with the pinion 22 and projects into the cylinder. 16 is a claw which is mounted on the eccentric 15 and with one of its ends enters the recess 25 in the cylinder 24, where it is provided with a cross bar 17 and two gripping pins 18. The opposite end of the gripper 16 is equipped with a sphere 19 which fits in a guide 20 on the gate 24. 21 is a plug for the reception of the guide 20 which may be displaced for varying the position of the guide with respect to the gate, or exchanged. The position of the partition lines of the pictures with respect to the gate openings 13 and 13′ may be regulated by adjusting the guide 20. In the position illustrated in Fig. 7, the opening 13 is active, and the claw 16 intermittently feeds the film toward this opening. When it is desired to feed the film in the opposite direction, the gate 24 is rotated so as to move the gate opening 13′ into the position of the gate opening 13. The recess 25 is now above the gate opening instead of being below it, as shown in Fig. 7, and the claw feeds the film in the opposite direction.

The pins 18 at the outer end of the claw describe the curve illustrated in Fig. 7 which has some similarity with the letter D positioned so that its curved portion faces the axis of the gate 24.

A mirror 55 the function of which is the same as that of the mirrors 4 and 5, Figs. 2–6, may be connected to the gate 24 so as to rotate with it. To this end a bracket 27 is formed on the bearing 26, projecting to the rear thereof, and a set screw 28 is inserted in a threaded hole at the outer end of the bracket, the free end of the screw being adapted to enter a recess 29 in the shaft 14 of the mirror. When the set screw 28 is retracted the shaft 14 is free to rotate independently of the gate 24.

A printer may also be designed so as to operate alternately as a "slit" machine, with continuous movement of the film, or a claw machine, with intermittent movement. If a printer of the type illustrated in Figs. 2–6 is equipped with claws 16, the films must be guided so as to form loops in front of the sprockets 7 and 77. When it is desired to operate the printer as a "slit" machine the claws 16 are retracted so as not to interfere with the continuous feeding of the films.

It is desirable that the character of the copies should be varied. This was effected heretofore by using various emulsions for the sensitive layer of the copies, or by varying the time of exposure, or the developing process. In contradistinction to these old methods I propose to vary the character of the copies by varying the character of the light. It is known that polarized rays give strongly contrasted or hard copies while diffused rays give less contrasted or mellow copies.

In Figs. 9–12 I have illustrated an apparatus by which polarized and diffused rays may be selectively admitted to a sensitive layer.

Referring first to Fig. 9, 6 is a source of light, 30 is a condenser, and 31 is a diaphragm of the Bucky type which is known in the Roentgen-art. The diaphragm is honeycombed by inclined and vertical partitions, the inclined partitions being shown in dotted lines at 32. The horizontal and vertical partitions constitute a set of passages of square section the area of which decreases from the end facing the condenser 30 to the opposite end. 33 is a rotary shutter at the rear of the Bucky diaphragm 31, n is the negative, for instance, a film, 34 is an objective which is subdivided into two units, with a rotary shutter 35 between them, and p is the positive which may also be a film, on which the negative n is copied under the influence of the shutters 33 and 35, and the objective 34.

Referring now to Fig. 10, the sector 33 is slotted at 36 and 37, with a short bridge 38 intermediate the long slot 36 and the short slot 37. Referring to Fig. 11, the shutter 35 is recessed along a portion of its perimeter and a slot 40 is formed intermediate the recess 39 and the axis of the shutter, its length being equal to that of the recess. 44 is a narrow strip extending along the outer side of slot 40. 41 is a short slot which extends from one end of the slot 40 to a point about diametrally opposite its other end, the radius of the inner edge of the short slot being about equal to that of the outer edge of the long slot and the width of the slot 41 being equal to that of the strip 44. Referring to Fig. 12, 42 is an auxiliary shutter which may be combined with the shutter 35 and has a short slot 43. Instead of a rocking auxiliary shutter 42 as shown in Fig. 12, I may provide a shutter which rotates about the axis of the shutter 35.

Other optical means, such as smoky glass and the like, may be provided instead of opaque shutters. Instead of a small source of light 6 in combination with the condenser 30 I may provide a large source of light in combination with a Bucky diaphragm 31 and without the condenser 30.

The objective 34 projects an image of the source of light 6 on the positive film p. The opening of the objective 34 must be larger than the image of the source of light, viewed within the objective in the plane of the shutter 35.

The shutters 33 and 35 are operatively connected so as to perform one rotation per copy. The opaque areas of both shutters shut out the light while the positive and the negative are exchanged. The slot 41 in the shutter 35 is so wide as to expose the image of the source of light while the opaque strip 44 is so wide as to conceal the image. The bridge 38 of the shutter 33 prevents passage of light while the shutter 35 changes from the slot 41 to the opaque strip 44. When the shutter 35 exposes the image of the source of light through the slot 41, the polarized light rays become active and a contrasted, hard copy will be obtained on the film p. Diffused rays pass through the slot 41 at both sides of the image. They are normally harmless but may be shut out by the short slot 43 of the auxiliary shutter 42 which is brought to intersect with the slot 41. When, on the other hand, the strip 44 conceals the image only deflected and therefore diffused rays become active, and the copy on the film p is less contrasted or mellow. The size of the slots 36 and 37 of the shutter 33 which correspond to the slots 40 and 41 in the shutter 35, may be varied by means of suitable blinds, not shown. The copy is obtained by two successive exposures, one with polarized, and one with diffused rays, and the desired character of the copy is obtained by suitably adjusting the blinds.

It will be understood that the copy on the film p is the result of two exposures, one with polarized, and the other with diffused rays. The operation of the apparatus is explained by the fact that the character of the copies obtained by polarized and by deflected rays, is different. A strict explanation could be given with the existence of the wave theory of light, but for selecting properly the dimensions of an apparatus as illustrated in Figs. 9–12, the following explanation will be sufficient:

Assume first that the negative $n$ is a homogeneous transparent layer without any silver granules. If the shutter 35 exposes the image of the source of light in the objective 34 the polarized rays will act on the positive $p$ at full intensity. On the other hand, if the strip 44 conceals altogether the image, no rays at all are admitted to the negative $p$ as there will be no diffusion of the light rays in the perfectly transparent negative $n$. The reverse of the perfectly transparent negative is the negative illustrated in Fig. 13 in which two rows 45 and 46 of silver granules are staggered so that the polarized rays are intercepted while the diffused rays pass through the openings between the granules. With such a negative, polarized rays are excluded when the image of the source of light is exposed by the slot 41 of the shutter 35 but diffused rays are admitted when the image is concealed by the strip 44.

The two extreme cases, a perfectly transparent negative, and a negative which intercepts the polarized rays altogether, give an explanation for the operation of my apparatus, for the transparent layer is copied light on the positive in one case and dark in the other, while the perfectly opaque negative is copied dark in the one, and light in the other case. Theoretically it is even possible to vary the character of the copies to such an extent as to obtain a positive copy in one case, and a negative copy in the other. In practice, conditions are much more complicated so that this result will never be obtained.

For good operation of the apparatus, the following conditions must be fulfilled: The opening of the objective 34, as mentioned already, must be larger than the image of the source of light in the plane of the shutter 35, and this in turn necessitates the provision of an aplanatic condenser 30. The slot 41 for the polarized rays must be much shorter than the sector 40 for the diffused rays, as the intensity of the diffused rays is much lower than that of the polarized rays while on the other hand the total effect of the exposures should be equal. The blinds for regulating the slots 36 and 37 in the shutter 33 are preferably so connected that the total amount of light and the ratio of polarized and diffused rays may be adjusted independently of each other. The blinds are equipped with handles and, for obtaining the results outlined above, the ratio of the handles must be different, and the size of the blinds must also be different. The blinds must be connected to their handles in such manner that when the handles are rotated in the same direction one of the blinds is opened and the other is closed. The handles may be coupled if desired.

The Bucky diaphragm 31 eliminates the influence of dust which might collect on the condenser 30. In order to reduce the action of the heat on the negative $n$ the shutter 33 is arranged intermediate the negative and the source of light.

As mentioned, my apparatus is suitable for all photographic copying processes, but is particularly useful for copying moving-picture films, as here the various conditions are fulfilled most readily.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. A film-printing machine comprising a pair of rotary picture gates with parallel axes of rotation about which said picture gates are curved, means for moving a film past each gate, an objective arranged intermediate said picture gates, the picture gate for the copy film being adapted to curve the copy film in conformity with the field of sharp reproduction of said objective, one of said gates presenting its concave and the other presenting its convex side to said objective, a source of light for illuminating one of said picture gates, a mirror combined with each gate for rotating therewith and for deflecting the light rays to and from said objective, and means for alternately connecting for rotation said mirrors to, and for disconnecting them from, the respective gates.

2. A film-printing machine comprising a pair of curved picture gates with parallel axes of curvature, an objective arranged intermediate said picture gates, means for moving a film past each gate, means operatively connected to said film-moving means for regulating the position of the pictures on one of said films with respect to the picture gate past which it is moved, the picture gate for the copy film being adapted to curve the copy film in conformity with the field of sharp repoduction of said objective, one of said gates presenting its concave and the other presenting its convex side to said objective, and a source of light arranged in the axis about which one of said picture gates is curved, for illuminating both picture gates and the objective.

3. A film-printing machine comprising a pair of rotary picture gates with parallel axes of rotation about which said picture gates are curved, an objective arranged intermediate said picture gates, means for moving a film past one of said gates, film-feeding means combined with the other picture gate in such manner as to maintain the proper position of said gate and the pictures on the film as said gate rotates, the picture gate for the copy film being adapted to curve the copy film in conformity with the field of sharp reproduction of said objective, one of said gates presenting its concave and the other presenting its convex side to said objective, and a source of light arranged in the axis about which one of said picture gates is curved, for illuminating both picture gates and the objective.

RUDOLPH THUN.